Patented May 18, 1926.

1,585,035

UNITED STATES PATENT OFFICE.

GEORGE A. HOWLAND, OF CHICAGO, ILLINOIS, ASSIGNOR TO JOHN H. THORNBURN, OF URBANA, ILLINOIS, AND EUGENE I. BURKE, OF CHAMPAIGN, ILLINOIS.

ELECTROLYTE FOR SECONDARY BATTERIES.

No Drawing. Application filed April 22, 1925. Serial No. 25,131.

This invention relates to electrolytes for electrical batteries, and more particularly to batteries used in connection with radio work, internal combustion engine starting, and the like.

An object of the invention is to provide a highly efficient electrolyte, composed of such chemicals and ingredients which, when properly admixed, will form an electrolyte capable of hardening about the plates of a secondary battery, thereby preventing buckling of the said plates.

Another object of the invention is to provide an improved electrolyte for secondary batteries, which when used with a plate construction, as set forth in my co-pending application filed on even date herewith, will be highly efficient in use.

A still further object of the invention is to provide an improved electrolyte for secondary batteries which will be so constructed that it will contain a suitable ingredient for preventing evaporation in the battery, and will contain suitable ingredients which act as a depolarizer, and serve to increase conductivity in the battery, and reduce the internal resistance.

Other objects will appear as the description proceeds.

It is my intention to use this electrolyte with my improved plate construction, and when the electrolyte is properly admixed with the correct proportions of ingredients, it will be capable of performing the necessary essentials to each and every kind of electrolyte.

My improved electrolyte is composed of 3½ pounds of soapstone, 3 ounces of carbon dust, 2 pounds of gypsum, 2 quarts of sulphuric acid having a specific gravity of 1125, 3 drops of snake oil, ½ ounce of salicylic acid, 1 quart of water, 2½ ounces of sodium chloride, ½ ounce of sodium chlorate, and 1 pint of potassium silicate.

The formula and directions for admixing the lectrolyte is as follows: The 3½ pounds of soapstone, 3 ounces of carbon dust and 2 pounds of gypsum are thoroughly admixed. After this a solution is formed of the 2 quarts of sulphuric acid having a specific gravity of 1125, 3 drops of snake oil, ½ ounce of salicylic acid, and the 1 quart of water, and is allowed to mix, without stirring, for approximately four to six minutes. These two admixtures are then combined and are stirred vigorously for approximately five minutes. The 2½ ounces of sodium chloride, ½ ounce of sodium chlorate, and 1 pint of potassium silicate are thoroughly admixed and are then combined with the previously combined admixtures for approximately ten minutes, after which the completed electrolyte in semi-liquid state may be poured into the battery about the plates and charged at the rate of 10 amperes for 10 hours.

It will be readily understood that some equivalents might be substituted for the ingredients of my electrolyte, but I have found that when the electrolyte is formed in accordance with my formula, and used with the plates described and claimed in a co-pending application filed on even date herewith, that great efficiency and long life will be had from the batteries employing my improvements.

I do not intend to limit myself to the exact proportions of the ingredients or to the exact ingredients inasmuch as it is well known that minor changes can readily be made without departing from the spirit of the invention.

Having thus described my invention, what I claim as new and desire to secure by Letters Patent of the United States, is:

1. An electrolyte comprising 3½ pounds of soapstone, 3 ounces of carbon dust, 2 pounds of gypsum, 2 quarts of sulphuric acid having a specific gravity of 1125, 3 drops of snake oil, ½ ounce of salicylic acid, 1 quart of water, 2½ ounces of sodium chloride, ½ ounce of sodium chlorate, and 1 pint of potassium silicate.

2. The method of making an electrolyte for secondary batteries comprising the mixing of 3½ pounds of soapstone with 3 ounces of carbon dust and 2 pounds of gypsum; adding a solution of 2 quarts of sulphuric acid having a specific gravity of 1125, 3 drops of snake oil, ½ ounce of salicylic acid, and 1 quart of water; permitting the same to admix without stirring for a period of 4 to 6 minutes; further adding a mixture of 2½ ounces of sodium chloride, ½ ounce of sodium chlorate, and 1 pint of potassium silicate; and thoroughly stirring the admixture for approximately 10 minutes, and finally charging the same at a rate of 10 amperes for 10 hours.

3. An electrolyte for secondary batteries comprising an admixture of soapstone, carbon dust, gypsum, sulphuric acid having a specific gravity of 1125, snake oil, salicylic acid, water, sodium chloride, sodium chlorate and potassium silicate.

4. An electrolyte for secondary batteries comprising a leadless admixture including soapstone, carbon dust, gypsum, sulphuric acid having a specific gravity of 1125, snake oil, salicylic acid, water, sodium chloride, sodium chlorate and potassium silicate.

5. An electrolyte for secondary batteries comprising a leadless and non-evaporating admixture including soapstone, carbon dust, gypsum, sulphuric acid having a specific gravity of 1125, snake oil, salicylic acid, water, sodium chloride, sodium chlorate and potassium silicate.

In testimony whereof I affix my signature.

GEORGE A. HOWLAND.